United States Patent
Glover

(10) Patent No.: US 10,778,346 B2
(45) Date of Patent: Sep. 15, 2020

(54) TEST DEVICE AND TEST METHOD

(71) Applicant: Rohde & Schwarz GmbH & Co. KG, Munich (DE)

(72) Inventor: Brian Glover, Aldershot (GB)

(73) Assignee: ROHDE & SCHWARZ GMBH & CO. KG, Munich (DE)

(*) Notice: Subject to any disclaimer, the term of this patent is extended or adjusted under 35 U.S.C. 154(b) by 76 days.

(21) Appl. No.: 15/986,935

(22) Filed: May 23, 2018

(65) Prior Publication Data
US 2019/0363806 A1    Nov. 28, 2019

(51) Int. Cl.
*H04B 17/15* (2015.01)
*H04B 7/26* (2006.01)
*H04B 17/29* (2015.01)

(52) U.S. Cl.
CPC ............ *H04B 17/15* (2015.01); *H04B 7/26* (2013.01); *H04B 17/29* (2015.01)

(58) Field of Classification Search
USPC ..................................... 455/67.14
See application file for complete search history.

(56) References Cited

U.S. PATENT DOCUMENTS

| | | | | |
|---|---|---|---|---|
| 2003/0153273 A1* | 8/2003 | Ebert | ............... | H04L 1/0001 455/67.14 |
| 2008/0287117 A1* | 11/2008 | Olgaard | ............ | H04B 17/0085 455/423 |
| 2013/0294255 A1* | 11/2013 | Olgaard | ............... | H04W 48/06 370/242 |
| 2014/0059397 A1* | 2/2014 | Barker, Jr. | ............ | H04W 48/18 714/712 |
| 2016/0066129 A1 | 3/2016 | Seidenberg et al. | | |
| 2017/0078030 A1 | 3/2017 | Oldgaard et al. | | |
| 2017/0078032 A1* | 3/2017 | Olgaard | ............... | H04B 17/17 |
| 2017/0170916 A1* | 6/2017 | Olgaard | ............... | H04B 17/29 |

* cited by examiner

*Primary Examiner* — Ganiyu A Hanidu
(74) *Attorney, Agent, or Firm* — Westman, Champlin & Koehler, P.A.

(57) ABSTRACT

Device and method for testing wireless devices without a physical connection to the wireless device which has to be tested. Accordingly, the reception and transmission of the wireless device which has to be tested is controlled only by a test data sequence which is repeatedly sent from a test device to the wireless device which has to be tested. Accordingly, a measurement of the responses from the device which is to be tested can be performed in order to evaluate the operation of the respective device.

14 Claims, 3 Drawing Sheets

TEST DEVICE AND TEST METHOD

TECHNICAL FIELD

The present invention relates to a test device. The present invention further relates to a test method.

BACKGROUND

Although applicable in principle to any wireless test system, the present invention and its underlying problem will be hereinafter described in combination with testing a wireless communication device.

The use of wireless devices for multiple purposes increases continuously. For example, wireless devices may be used for communication purposes, data exchange of wireless personal area networks and many other applications.

During development and production of wireless devices, it is necessary to thoroughly test the devices for compliance with communication standards a legal regulations.

For some test applications, a device under test may be located in a test environment and the radio frequency properties of the device under test may be measured. For this purpose, the device under test may be controlled by means of an additional communication link. In particular, the additional communication link may be realized by a wireless or wired communication between the device under test and a controller of the test arrangement.

However, for some devices it may be not possible to realize a physical control connection between the device under test and an external controller for controlling the operation of the device under test. In particular, many final products may not be provided with an interface for controlling the operation during a desired test scenario. For example, many Bluetooth devices, in particular Bluetooth low energy devices may not be provided with an additional interface for controlling the device during a test.

Against this background, the problem addressed by the present invention is to provide a simple test device and test method for testing wireless devices, in particular for testing wireless devices which do not comprise a control interface.

SUMMARY

The present invention solves this problem by a test device and a test method with the features of the independent claims. Further embodiments are subject matter of the dependent claims.

According to a first aspect, a test device for wirelessly testing a device under test is provided. The test device is configured to wirelessly send a test data sequence to the device under test. The test data sequence may cause the device under test to wirelessly send a response to the test device. In particular, the test device repeatedly sends the test data sequence to the device under test.

According to a second aspect, a test method for wirelessly testing a device under test is provided. The test method comprises a step of generating a test data sequence. The test data sequence may be generated by a test device. The test data sequence may cause the device under test to send a response. In particular, the response may be sent to the test device. The method further comprises a step of repeatedly sending the test data sequence to the device under test. The repeatedly sending of the test data sequence may be performed by the test device.

The present invention is based on the fact that at least some wireless devices are not equipped with an external interface for controlling the operation of the wireless device. Accordingly, such devices may not be tested by controlling the transmission and reception for testing the devices. Furthermore, the present invention is based on the fact that even such devices usually perform a wireless communication with a further wireless communication partner by sending and receiving wireless data.

Thus, it is an idea of the present invention to cause the device under test sending wireless signals by repeatedly sending requests to the device under test.

In other words, a test data sequence is provided to the device under test which causes the device under test to send a response upon receiving the test data sequence. In particular, the device under test may send a predetermined, i.e. a well-known response to the test data sequence provided to the device under test. In this way, it is possible to measure and analyze the response of the device under test in order to evaluate the radio frequency properties and the operation of the device under test. By repeatedly sending the test data sequence multiple times to the device under test, the device under test may also send multiple responses. In this way, the radio frequency properties and the operation of the device under test can be measured over a longer time period. In particular, it is possible to monitor the radio frequency properties and the operation of the device under test for a predetermined time period or a predetermined number of responses.

Moreover, the properties of sending the test data sequences to the device under test may be changed during the repeatedly sending of the test data sequence to the device under test. Additionally or alternatively, further conditions, for example external disturbances, an external signal, e.g. noise etc. may be applied and/or modified during the repeatedly sending of the test data sequence and the analysis of the respective responses from the device under test.

The test data sequence for causing a response of the device under test may be any appropriate test data sequence. For example, the test data sequence may cause the device under test to transmit an identifier of the device under test, a predetermined status response, or any other kind of a response. In particular, the test data sequence may cause the device under test to send out the same response for each received data test sequence. In particular, the test data sequence may cause the device under test to send a predetermined response, in particular a response which is already known in advance. In this way, the response of the device under test may be easily measured and analyzed in order to assess the device under test.

The test data sequence which is sent from the test device to the device under test may be a predetermined test data sequence which may be stored in a memory of the test device. For this purpose, test device may comprise a memory for storing a number of one or more test data sequences which can be used for testing the device under test. For example, multiple test data sequences may be stored in advance, and an appropriate test data sequence may be selected. For example, it may be possible to provide multiple test data sequences for different devices under test. Furthermore, multiple test data sequences may be provided for performing multiple different tests of a device under test. Thus, an appropriate test data sequence may be selected depending on a desired test and/or the respective device under test which has to be tested. However, it is understood that any other appropriate scheme for determining a test data sequence may be also possible. For example, an appropriate test data sequence may be computed each time, a device under test has to be tested. In this case, the test data sequence may be computed based on the respective device under test and/or a desired test scenario.

Further embodiments of the present invention are subject of the further sub-claims and the following description referring to the drawings.

In a possible embodiment, the test device may measure the response which is sent wirelessly by the device under test in response to the test data sequence sent from the test device to the device under test.

The measurement of the response which is sent by the device under test may comprise any kind of radio frequency properties. For example, it may be possible to measure a received signal power strength, a signal to noise ratio, an error rate in the received response, a response time, i.e. a time interval between sending the test data sequence and receiving the response of the device under test, or any other appropriate parameter of the response from the device under test. Furthermore, it may be also possible to analyze the data in the response from the device under test. For example, the data of the response from the device under test may change depending on the transmission properties in the transmission channel between the test device and the device under test. In particular, it may be possible, that the device under test may generate a response depending on the test data sequence which has been received by the device under test. If the device under test cannot receive the test data sequence correctly, the response of the device under test may change, or the device under test may even not send a response, if the test data sequence is received improperly. Hence, the test device may evaluate the properties of the device under test depending on the response of the device under test.

In a possible embodiment, the test device may increase or decrease a time interval between successively sending test data sequences when repeatedly sending the test data sequence to the device under test.

For example, a time interval between two successive transmissions of the test data sequence may be increased or decreased by a predetermined value. The predetermined value may be an absolute or relative value. In this way, it may be possible to identify a minimum or maximum time interval which causes an appropriate response of the device under test. Furthermore, it may be possible to identify a time interval between two successive transmissions of the test data sequence which causes a change of the response sent by the device under test. However, it is understood that any other appropriate scheme for changing the time between two successive transmissions of the test data sequence may be also possible.

In a possible embodiment, the test device may increase or decrease a transmission power of the test data sequence when repeatedly sending the test data sequence to the device under test.

For example, the transmission power for sending the test data sequence to the device under test may be increased or decreased by a predetermined value. The predetermined value may be an absolute or relative value. However, it may be also possible to apply a same transmission power for a predetermined number of successively sent test data sequences, and to increase or decrease the transmission power each time the predetermined number of test data sequences has been sent. In this way, it is possible to identify a minimum or maximum transmission power which causes the device under test to send the respective response.

Furthermore, any other appropriate parameter for sending the test data sequence to the device under test may be also modified. For example, it may be possible to change a frequency for sending the test data sequence to the device under test, to send the test data sequence on different transmission channels or the like. However, it is understood that the present invention is not limited to the above-mentioned parameters which can be modified during repeatedly sending the test data sequence. Moreover, any other appropriate parameter may be also changed during the repeatedly sending of the test data sequence.

In a possible embodiment, a same test data sequence is sent to the device under test each time during the repeatedly sending of the test data sequence to the device under test.

For example, a predetermined, in particular a pre-stored test data sequence may be used for repeatedly sending the test data sequence to the device under test. By using always the same test data sequence during the repeatedly sending of the test data sequence, a same response of the device under test may be expected each time the device under test receives the respective test data sequence.

In an alternative embodiment, the test data sequence may be modified or changed during the repeatedly sending of the test data sequence to the device under test. By modifying the content of the test data sequence during the repeatedly sending of the test data sequence, a change of the response of the device under test may be analyzed.

In a possible embodiment, the test device may establish a wireless communication link between the test device and the device under test before repeatedly sending the test data sequence to the device under test.

For example, the test device may initiate a communication with the device under test before repeatedly sending the test data sequence to the device under test. For example, the initialization may comprise an authorization or the like. In this way, it is possible to test a wireless device under test even though the device under test may restrict the wireless communication to limited communication partners. However, any other kind of initialization or establishing a communication between the device under test and the test device may be also possible.

In a possible embodiment, the test device may establish a Bluetooth connection between the test device and the device under test. In particular, the test device may establish a Bluetooth low energy connection (Bluetooth LE).

In a possible embodiment, the test device comprises a test antenna and a test data generator. The test antenna may be configured to receive wireless signals from the device under test and to transmit wireless signals to the device under test. The test data generator may be coupled to the test antenna. The test data generator may be configured to generate the test data sequence, to generate a wireless signal based on the generated test data sequence, and to repeatedly forward the wireless signal to the test antenna.

The test antenna may be any type of test antenna that is appropriate to transmit and receive the required signals. For example, the test antenna may be a microstrip antenna, a rod antenna or a horn antenna. The test antenna may be adapted in size according to the relevant signal frequencies or wavelengths.

The test antenna may comprise a signal connector and may be coupled to the test data generator, for example by a signal cable. The signal cable may be, for example, a cable that has the required radio frequency properties with respect to a damping factor and impedance.

The test data generator may be realized, at least in part, by digital hardware. For example, the test data generator may comprise a signal processor. Such a signal processor may comprise, for example a general purpose processor with corresponding instructions. Further, the signal processor may comprise interfacing elements for providing radio frequency signals to the test antenna and/or receiving radio frequency signals from the test antenna. Such interfacing elements may comprise, for example, digital to analogue converters that convert digital data into analogue signals. Between the digital to analogue converters and the output port of the test data generator, analogue elements like for example filters, comprising resistors, capacitors and inductors or the like may be provided.

In a possible embodiment, the test device may further comprise a measurement processor. The measurement processor may be adapted to analyze the wireless signals received from the device under test by the test antenna.

For example, the measurement processor may analyze a signal strength, in particular a power of a received signal, a signal to noise ratio, or any other properties of a received radio frequency signal. Furthermore, the signal processor may analyze the data comprised in the wireless signals in order to determine, for example, an error rate, analyze the data comprised in the received wireless signal, or to perform any other analysis based on the data included in the received wireless signal.

The signal processor and/or the measurement processor may comprise hardware elements like, for example a processing unit. However, the signal processor and/or the measurement processor may also be software implemented at least in part. For example, respective instructions may be stored in a memory that is coupled to a general purpose processor, for example via a memory bus. The processor may further execute an operating system that loads and executes the instructions. The processor may be, for example an Intel processor that runs Microsoft or Linux operating system that loads and executes the instructions. In another embodiment, the processor may be a processor of a measurement device that may run, for example, an embedded operating system that loads and executes the instructions.

With the present invention it is therefore possible to test wireless devices, even if the respective wireless devices do not provide interfacing elements for controlling the devices. In particular, it is possible to test wireless devices, like for example, Bluetooth low energy devices even if such devices cannot be controlled by a physical connection, in particular a wired control interface.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

Figure 1:
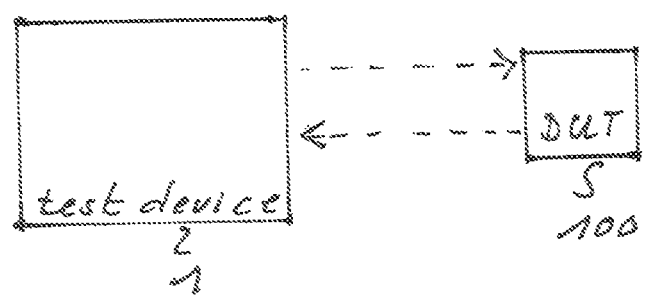
FIG. 1 shows a block diagram of an embodiment of a test device according to the present invention.

The appended drawings are intended to provide further understanding of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown to scale.

In the drawings, like, functionally equivalent and identically operating elements, features and components are provided with like reference signs in each case, unless stated otherwise.

DETAILED DESCRIPTION OF THE DRAWINGS

FIG. 1 shows a test device 1 for wirelessly testing a device under test 100 according to an embodiment. The test device 1 may perform a wireless testing of the device under test 100 without a need of a physical connection to the device under test 100 for controlling the operation of the device under test 100 during the test procedure. For this purpose, the test device 1 may repeatedly send a test data sequence to the device under test 100. Each test data sequence which is sent from the test device 1 to the device under test 100 may cause the device under test 100 to send a response to the test device 1. Accordingly, the test device 1 may receive the response from the device under test 100 in response to the test data sequence, and analyze the received response. The transmission of the test data and the corresponding responses is performed wirelessly.

The test data sequence which is sent by the test device 1 to the device under test 100 may be any kind of appropriate test data sequence which may cause the device under test 100 to send a response upon receiving the test data sequence. For example, the data of the respective test data sequence may be pre-stored in a memory of the test device 1. In particular, it may be possible to pre-store a number of one or more appropriate test data sequences which may be used for testing the device under test 100. For example, multiple predetermined test data sequences may be stored in the test device 1, for testing different devices under test 100. Accordingly, the test device 1 may select an appropriate test data sequence depending on the respective device under test which has to be tested. For example, an appropriate test data sequence may be selected based on a type of the device under test 100, an identifier of the device under test 100, or any other parameter for specifying the device under test 100. The respective information for identifying the device under test 100 and/or for selecting the appropriate test data sequence may be determined automatically based on an identification of the device under test 100. Furthermore, it may be also possible that a user may select an appropriate test data sequence out of a number of pre-stored test data sequences. However, any other scheme for selecting an appropriate test data sequence may be also possible.

The test data sequence may be, for example, a number of one or more data packets comprising data for causing the device under test 100 to send a response. For example, the test data sequence may comprise a request for causing the device under test 100 to send a reply to this request. In one example, the test data sequence may cause the device under test 100 to send an identifier of the device under test 100, to send a requested value which may be pre-stored or determined by the device under test 100, to send a confirmation for receiving the test data sequence, or any other appropriate response. It is understood, that the reply of the device under test 100 is not limited to the before mentioned examples. Moreover, any other kind of response upon receiving the test data sequence may be also possible.

As already mentioned above, the test device 1 may repeatedly send the test data sequence to the device under test 100 multiple times. For example, the test data sequence may be sent to the device under test 100 for a predetermined number of times. However, it may be also possible that the test device 1 may repeatedly send the test data sequence to the device under test 100 upon a stop condition is met. For example, the test data sequence may be repeatedly sent to the device under test 100 upon a user manually stops the transmission of the test data sequence. Moreover, it may be also possible that the transmission of the test data sequence is automatically stopped upon a predetermined condition is met. For example, the transmission of the test data sequence may be stopped upon a predetermined test procedure has been finished, upon a predetermined condition is met, e.g. an error occurs, or any other condition for stopping the testing of the device under test 100 is fulfilled.

The test device 1 may vary one or more parameters of the repeated transmission of the test data sequence to the device under test 100. For example, the time interval between transmissions of two successive test data sequences may be changed. For example, the time interval between two successive test data sequences may continuously increase or decrease. Accordingly, the test device may further measure the response of the device under test 100 in order to analyze the responses of the device under test 100 based on the variation of the time sequence between the successive test data sequences.

Furthermore, it may be also possible to modify any other parameter of the test data sequences during the repeated transmission of the test data sequences. In one example, it may be possible to increase or decrease a transmission power of the test data sequences when repeatedly sending the test data sequence to the device under test 100. For example, the transmission power may be successively increased or decreased, and the test device 1 may monitor a change of the responses depending on the transmission power of the test data sequence. For example, the device under test 100 may not be able to receive the test data sequence, if the transmission power of the test data sequence decreases below a threshold value. Accordingly, the test device 1 may recognize that the device under test 100 does not further send a response to the test data sequence when the transmission power decreases below such a threshold value. In this case, the test device 1 may determine the respective threshold value of the transmission power when no further responses of the device under test 100 are received. Alternatively, it may be also possible to successively increase the transmission power and to determine the transmission power when a first response of the device under test 100 is received.

It is understood, that any other parameter for sending the test data sequences from the test device 1 to the device under test 100 may be also possible. For example, it may be possible to vary the frequency for sending the test data sequence, to change a transmission channel during the successive transmission of the test data sequences, to modify a signal to noise ratio, to add additional disturbances, for example additional radio frequency signals or the like, or to apply any other modification during the repeatedly transmission of the test data sequence from the test device 1 to the device under test 100 and the analysis of the responses from the device under test 100 based on the transmitted test data sequences.

When varying one or more parameters during the repeatedly transmission of the test data sequence, the respective parameter may be changed each time a test data sequence is sent. Furthermore, it may be also possible to repeatedly send the test data sequence for a predetermined number of times, e.g. five times, ten times, twenty times, one hundred times, and to apply a change of the respective parameters after repeatedly sending the test data sequence for the selected number of times.

The test data sequence which is repeatedly sent by the test device 1 may be the same test data sequence each time the test data sequence is sent. Accordingly, it may be expected that the device under test 100 always sends the same response to the test data sequence. However, it may be also possible that the test data sequence which is sent from the test device 1 to the device under test 100 may be changed during the testing of the device under test 100.

As already mentioned above, the response of the device under test 100 is initiated in response to the test data sequence. Accordingly, no further physical connection between the test device 1 and the device under test 100 has to be applied. In particular, no wired connection to the device under test 100 has to be applied. Furthermore, it is even not necessary to add an additional link, even no additional wireless link to the device under test 100 in order to control the operation, in particular the transmission of the device under test 100 during the test. Moreover, the transmission of the wireless signals emitted by the device under test 100 are only based on the test data sequences sent from the test device 1.

Figure 2:
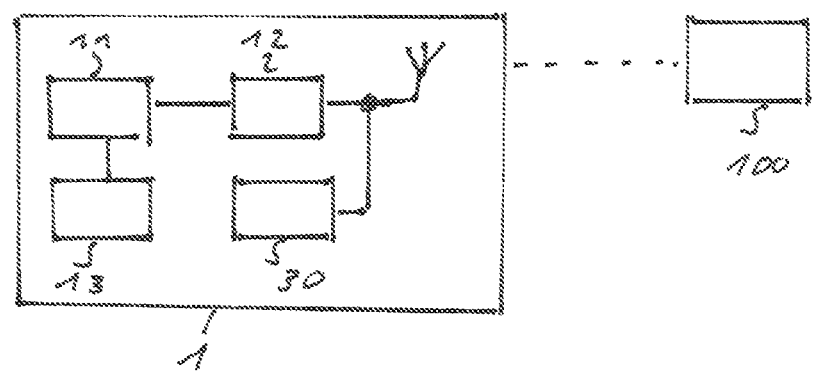
FIG. 2 shows a block diagram of another embodiment of a device arrangement according to the present invention.

FIG. 2 shows a block diagram of a test device 1 according to a further embodiment. As can be seen, test device 1 may comprise a test data generator 10 and a test antenna 20. The test data generator 10 may comprise a processing device 11 for generating the test data sequence. As already mentioned above, the test data sequence may be determined out of a number of pre-stored test data sequences which may be stored in a memory 13 of the test data generator 10. However, it may be also possible that the processing device 11 may compute an individual test data sequence depending on the related device under test 100. It may be also possible that different test data sequences may be determined depending on a desired test scenario. For example, a first test data sequence may cause the device under test 100 to send a short response, for example only an acknowledgement of receiving the test data sequence. Furthermore, an alternative test data sequence may cause the device under test 100 to send a longer response, for example a response comprising hundreds or even thousands of bits or bytes. Accordingly, such a long response may be used for appropriate analysis of the radio frequency signals emitted by the device under test 100. Furthermore, there may be test data sequences which cause the device under test 100 to perform complex computations. In this way, the computation capabilities of the device under test 100 may be tested. However, it is understood that any other kind of test data sequence for causing the device under test 100 to perform respective operations may be also possible.

The test data sequence which may be determined or computed in the processing device 11 may be forwarded to a radio frequency device 12. The radio frequency device 12 may generate a radio frequency signal comprising the data provided by the processing unit 11. In this way, the test data sequence may be sent to the device under test 100 by a radio frequency signal generated by the radio frequency device 12. For example, radio frequency device 12 may perform any kind of modulation of a radio frequency signal in order to include the digital information provided by the processing unit 11. The generated radio frequency signal may be forwarded to antenna 20. Accordingly, antenna 20 may emit the radio frequency signal as a wireless signal to the device under test 100. In response to the received test data sequence by the emitted radio frequency signal, the device under test 100 may wirelessly send a response to the test device 1. The response may be received by antenna 20 and forwarded to measurement processor 30. Measurement processor 30 may analyze the received response of the device under test 100 in order to evaluate the operation of the device under test 100. For example, it may be determined whether or not a response has been received from the device under test 100. Furthermore, the data of the response received from the device under test 100 may be analyzed. In particular, it may be possible to determine whether the received response corresponds to an expected response. Furthermore, an error rate in the received data may be determined, a signal to noise ratio of the received radio frequency signal from the device under test 100 may be measured, a signal power of the received radio frequency signal from the device under test 100 may be determined, or any other parameter relating to the response from the device under test 100 may be determined. In this way, it is possible to determine whether or not the responses from the device under test 100 in response to the repeatedly transmitted test data sequences may fulfill predetermined test conditions. In this way, it is possible to perform a quality control of the device under test 100, even though the respective device under test 100 does not provide an interface for physically connecting a wired signal line.

Figure 3:
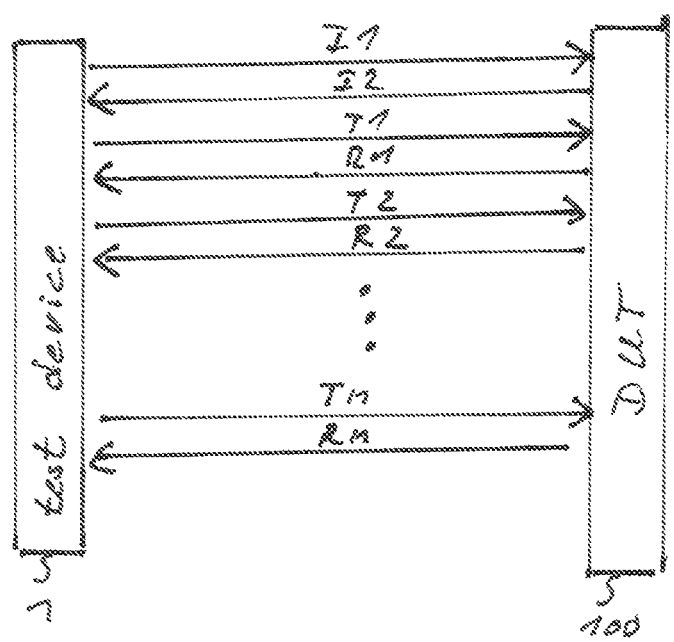
FIG. 3 shows a diagram illustrating the transmission and reception of wireless signals send by test device according to an embodiment of the present invention.

FIG. 3 schematically illustrates a diagram of the transmission reception of data by the test device according to an embodiment. When starting a test of a device under test 100, a wireless connection between the test device 1 and the device under test 100 is established. For this purpose, the test device 1 may send a request I1 to the device under test 100. For example, during the initialization of the connection, an authorization of the test device 1 may be performed to the device under test 100. The device under test 100 may confirm the established connection with the test device 1 by appropriate message I2. Upon the connection between the test device 1 and the device under test 100 has been established, the test device 1 may send a first test data sequence T1 to the device under test 100. In response to this first test data sequence T1, the device under test 100 may return a first response R1 to the test device 1. Next, a second test data sequence T2 is sent from the test device 1 to the device under test 100, and a second response R2 may be sent from the device under test 100 to the test device 1. Accordingly, this operation of sending test data sequences to the device under test 100 and sending responses from the device under test 100 to the test device 1 may be repeated multiple times.

As illustrated in this example, a further test data sequence Ti may be sent after a response Ri-1 of a previous test data sequence Ti-1 has been received. However, it may be also possible to send a further test data sequence Ti even though no response of a previous test data sequence Ti-1 has been received. Furthermore, it may be even possible to send multiple test data sequences Ti before the device under test 100 may be in a position to send a response Ri. It is understood that any combination of sending test data sequences and sending responses to the respective test data sequences may be possible.

During the transmission of the test data sequences and the sending of the responses by the device under test 100, a measurement of the radio frequency signals between the device under test 100 and the test device 1 may be performed. As already mentioned above, the analysis of the radio frequency signals and/or the data included in the radio frequency signals may be performed by a measurement processor 30 of the test device 1. However, it may be also possible to perform the measurement of the test data sequences and the responses by an additional, external measurement device.

For sake of clarity in the following description of the method based on FIG. 4, reference signs used above in the description of the apparatuses in FIGS. 1 and 2 will be maintained.

Figure 4:
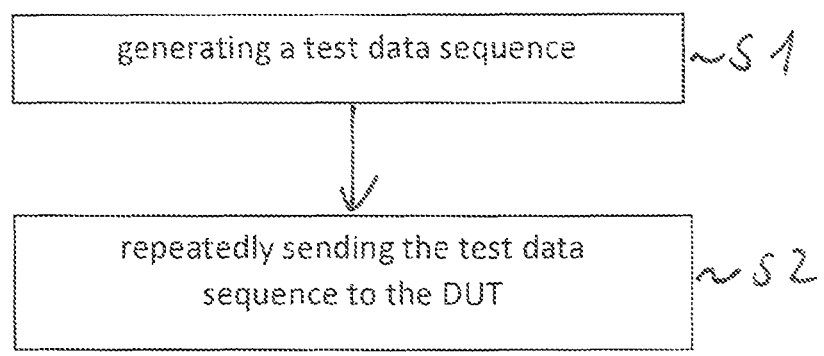
FIG. 4 shows a flow diagram of an embodiment of a test method according to the present invention.

FIG. 4 shows a flow diagram of a test method for wirelessly testing a device under test 100. The test method comprises generating S1 a test data sequence by a test device 1 for causing the device under test 100 to send a response to the test device 1. Furthermore, the test method comprises repeatedly sending S2 the test data sequence to the device under test 100 by the test device 1.

Furthermore, the test method may comprise measuring a response sent by the device under test 100. In particular, the response may be measured by a measurement processor 30 of the test device, or an external measurement device.

As already mentioned above, a time interval between successive test data sequences for repeatedly sending the test data sequence to the device under test 100 may be increased or decreased.

Furthermore, a transmission power of the test data sequence may be increased or decreased when repeatedly sending the test data sequence to the device under test 100.

In particular, a same test data sequence may be sent to the device under test 100 each time when repeatedly sending the test data sequence to the device under test 100. Furthermore, a testing of the device under test 100 may be performed without a physical connection between the test device 1 and the device under test 100.

The test method may further comprise a step of establishing a wireless communication link between the test device and the device under test 100 before repeatedly sending the test data sequence to the device under test 100. In particular, the establishing of the wireless communication link may comprise an authorization of the test device by the device under test 100.

The above-mentioned testing of a device under test 100 by a test device 1 may be performed for any kind of wireless devices. In particular, the testing of wireless devices may be applied to wireless devices which do not provide an interface for a physical connection to control the operation of the device under test 100. For example, such devices may be devices of an internet of things (IoT) or the like. In particular, the testing of the device under test 100 may be applied to Bluetooth devices, in particular to Bluetooth low emission (Bluetooth LE) devices.

Summarizing, the present invention relates to a testing of wireless devices without a physical connection to the wireless device which has to be tested. Accordingly, the reception and transmission of the wireless device which has to be tested is controlled only by a test data sequence which is repeatedly sent from a test device to the wireless device which has to be tested. Accordingly, a measurement of the responses from the device which is to be tested can be performed in order to evaluate the operation of the respective device.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

The invention claimed is:

1. A test device for wirelessly testing a device under test, the test device being configured to wirelessly send a test data sequence to the device under test for causing the device under test to send a response to the test device,
   wherein the test device repeatedly sends the test data sequence to the device under test, and
   wherein the test device is adapted to establish a Bluetooth low energy connection between the test device and the device under test before repeatedly sending the test data sequence to the device under test,
   wherein the test device is configured to increase or decrease a time interval between successive test data sequences by a predetermined value when repeatedly sending the test data sequence to the device under test.

2. The test device of claim 1, wherein the test device is further configured to measure a response send by the device under test.

3. The test device of claim 1, wherein the test device is configured to increase or decrease a transmission power of the test data sequence when repeatedly sending the test data sequence to the device under test.

4. The test device of claim 1, wherein a same test data sequence is sent to the device under test each time when repeatedly sending the test data sequence to the device under test.

5. The test device of claim 1, wherein the test device is adapted to test the device under test without a physical connection between the test device and the device under test.

6. The test device of claim 1, comprising:
   a test antenna for receiving wireless signals from the device under test and transmitting wireless signals to the device under test, and
   a test data generator that is coupled to the test antenna, wherein the test data generator is adapted to generate the test data sequence, to generate a wireless signal based on the generated test data sequence, and to repeatedly forward the wireless signal to the test antenna.

7. The test device of claim 6, comprising a measurement processor for analyzing the wireless signals received from the device under test by the test antenna.

8. A test method for wirelessly testing a device under test, the test method comprising:
   establishing a Bluetooth low energy connection between the test device and the device under test,
   generating a test data sequence by a test device for causing the device under test to send a response to the test device, and
   repeatedly sending the test data sequence wirelessly to the device under test by the test device after the Bluetooth low energy connection between the test de-vice and the device under test has been established,
   wherein a time interval between successive test data sequences for repeatedly sending the test data sequence to the device under test is increased or decreased by a predetermined value.

9. The test method of claim 8, comprising measuring a response send by the device under test.

10. The test method of claim 8, wherein a transmission power of the test data sequence is increased or decreased when repeatedly sending the test data sequence to the device under test.

11. The test method of claim 8, wherein a same test data sequence is sent to the device under test each time when repeatedly sending the test data sequence to the device under test.

12. The test method of claim 8, wherein a testing of the device under test is performed without a physical connection between the test device and the device under test.

13. The test method of claim 8, comprising:
   generating the test data sequence by a test data generator;
   repeatedly generating a wireless signal based on the generated test data sequence by the test data generator; and
   transmitting the wireless signals to the device under test by a test antenna.

14. The test method of claim 13, comprising:
   receiving wireless signals from the device under test by the test antenna; and
   analyzing the received wireless signals by a measurement processor.

* * * * *